(12) United States Patent
Leslie et al.

(10) Patent No.: US 7,189,016 B2
(45) Date of Patent: Mar. 13, 2007

(54) SYSTEM AND METHOD FOR EXPEDITED REPRINTING

(75) Inventors: Sara Lynn Leslie, Washougal, WA (US); Nathaniel Zachary Rutman, Portland, OR (US); Gary Lin Gaebel, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 283 days.

(21) Appl. No.: 10/929,314

(22) Filed: Aug. 30, 2004

(65) Prior Publication Data

US 2006/0045597 A1    Mar. 2, 2006

(51) Int. Cl.
*B41J 11/44* (2006.01)

(52) U.S. Cl. .................. 400/76; 400/61; 400/62; 358/1.15

(58) Field of Classification Search ............ 400/70, 400/76, 61, 62, 63; 358/1.15–1.17, 1.9
See application file for complete search history.

(56) References Cited

U.S. PATENT DOCUMENTS

| | | | |
|---|---|---|---|
| 4,630,198 A | 12/1986 | I-Yuan | 364/200 |
| 6,089,765 A | 7/2000 | Mori | 400/61 |
| 6,975,421 B1* | 12/2005 | Hashimoto et al. | 358/1.16 |
| 7,016,061 B1* | 3/2006 | Hewitt | 358/1.15 |
| 2002/0075514 A1 | 6/2002 | Wright et al. | 358/1.15 |

FOREIGN PATENT DOCUMENTS

| | | |
|---|---|---|
| EP | 0613081 | 8/1994 |
| JP | 2000141789 | 5/2000 |

* cited by examiner

*Primary Examiner*—Minh Chau
(74) *Attorney, Agent, or Firm*—Law Office of Gerald Maliszewski; Gerald Maliszewski

(57) ABSTRACT

A system and method are provided for the expedited reprinting of documents at a printer. The method comprises: receiving an initial print job identified with a job identification (JID); rendering the print job into a bitmap; in response to rendering the bitmap, initially printing a document; saving the bitmap in memory; and, in a job table, creating a cross-reference between the JID and the saved bitmap. Subsequently, the method comprises: receiving a selected JID; accessing the job table; accessing a print engine-ready bitmap associated with the JID by using the job table to locate a bitmap cross-referenced to the received JID; reading the located bitmap from a printer memory; and, reprinting a document in response to the bitmap. An associated network server can be used for posting a job table with selectable JIDs on an HTML webpage. Alternately, the JID selection is received in a print driver communication.

36 Claims, 6 Drawing Sheets

Fig. 2

JOB TABLE

| JID | BITMAP LOCATION | JOB ATTRIBUTES (JA) |
|---|---|---|
| 1 | A | TRAY 3<br>STAPLE LEFT CORNER |
| 2 | C | LAST PRINTED ON:<br>5/19/2004; 2PM |
| ⋮ | | |
| N | X | DOCUMENT NAME: EMMA'S PROJECT |

SYSTEM AND METHOD FOR EXPEDITED REPRINTING

BACKGROUND OF THE INVENTION

1. Field of the Invention

This invention generally relates to digital document processing and, more particularly, to a system and method for using the saved bitmaps of previously printed documents to expedite reprinting.

2. Description of the Related Art

In an office environment there is often a need to reprint documents. For example, a user sitting at their desk may require another hard copy of a document that they printed last week. Unfortunately, the document is 1000 pages long, and took 2 hours to print the first time. In this situation a reprint could be created faster if the printer controller had access to the bitmap used for the initial printing.

Conventionally, this problem has been incompletely addressed. For example, U.S. Pat. No. 6,089,765 describes the use of a front panel to select the file from printer memory to be used for printing. This method is inconvenient if the user is at their desk, and the front panel is a poor substitute for a keyboard and monitor. U.S. Pat. No. 4,630,198 describes the use of a printer's RAM as storage, but only on a single job basis. Again, no convenient file access is described.

US Publication 2003/0133167 describes the storage of only photographic images on the printer, but not other types of input. US Publication 2001/0029513 adds an identifier to the initial hard copy. The identifying mark can subsequently be read in, decoded, and used to retrieve the soft copy for printing. U.S. Pat. No. 6,089,765 describes the storage of data in a user's computer, not in the printer. The bitmaps must be sent over the network to the printer. This delivery takes time and creates a network traffic burden.

It would be advantageous if a printer could save the bitmaps used for the initial printing on its hard disk. It would also be advantageous if the printer maintained a table that cross-referenced a job identifier to the location of stored bitmaps in memory.

It would be advantageous if the reprinting of documents could be accomplished by retrieving the bitmap of the initial print job using a job identifier sent to the printer from a user's personal computer (PC).

SUMMARY OF THE INVENTION

A scenario for the use of the present invention expedited reprinting process follows. A hard copy of the document is needed. When initially printing the document, the procedure appears conventional to the user, as the user performs no extra operations. On their computer, the user brings up their application, such as Microsoft Word, then opens their document, and selects the "print" option. The print driver offers some options, such as input paper tray and staple. Later, the user picks up the hard copy at the printer. The user doesn't notice that the printer driver supplies job identification (JID) and job attributes (JA), such as the original document name, sender name, and papertype setting. The printer driver sends the JID and JA, along with a printer description language (PDL) version of the document, to the printer.

The printer controller reads in the JID, JA, and the PDL. It interprets the PDL and renders a bitmap for each printed page. It then sends the bitmap to the print (marking) engine and stores the bitmap on the printer's hard disk. When the entire job has been printed, the job information is stored in a job table, along with the location of the bitmaps on the hard disk. Additional data can be added, such as the date and time. It may be useful to save the job attributes (JA) associated with the print job, such as staple or paper tray selected. Subsequently, the document can be reprinted at engine speed. To do this, the user opens a web browser for example, opens the printer's web page, goes to the stored documents list, and selects the document to print.

Accordingly, a method is provided for the expedited reprinting of documents at a printer. The method comprises: receiving an initial print job identified with a JID; rendering the print job into a bitmap; in response to rendering the bitmap, initially printing a document; saving the bitmap in memory; and, in a job table, creating a cross-reference between the JID and the saved bitmap.

Subsequently, the method comprises: receiving a selected JID; accessing a job table; accessing a print engine-ready bitmap associated with the JID by using the job table to locate a bitmap cross-referenced to the received JID; reading the located bitmap from a printer memory; and, reprinting a document in response to the bitmap.

In one aspect, an associated network server is used for posting a job table with selectable JIDs on an HTML webpage. Then, JID selections are received via an HTTP communication from a connected client. Alternately, the JID selection is received in a print driver communication.

Additionally, job attributes (JA) associated with the print job may be saved, such as document name, source print driver client IP address, sender name, source computer name, compression method, encryption method, encoded password, origination time/date, or job attributes such as stapling, paper tray, sheet assembly, print time/date, and collation. These job attributes may be saved along with the bitmap and used in processing a reprinted document. In other aspects, job attributes associated with initially printing the document, such as stapling, paper tray, or sheet assembly, are monitored and saved with the JID in the job table. Again, the reprinted document may be processed using these saved job attributes.

Additional details of the above described method and a system for the expedited reprinting of documents are provided below.

BRIEF DESCRIPTION OF THE DRAWINGS

FIG. 2 is a drawing representing an exemplary job table.

DETAILED DESCRIPTION OF THE PREFERRED EMBODIMENTS

Figure 1:
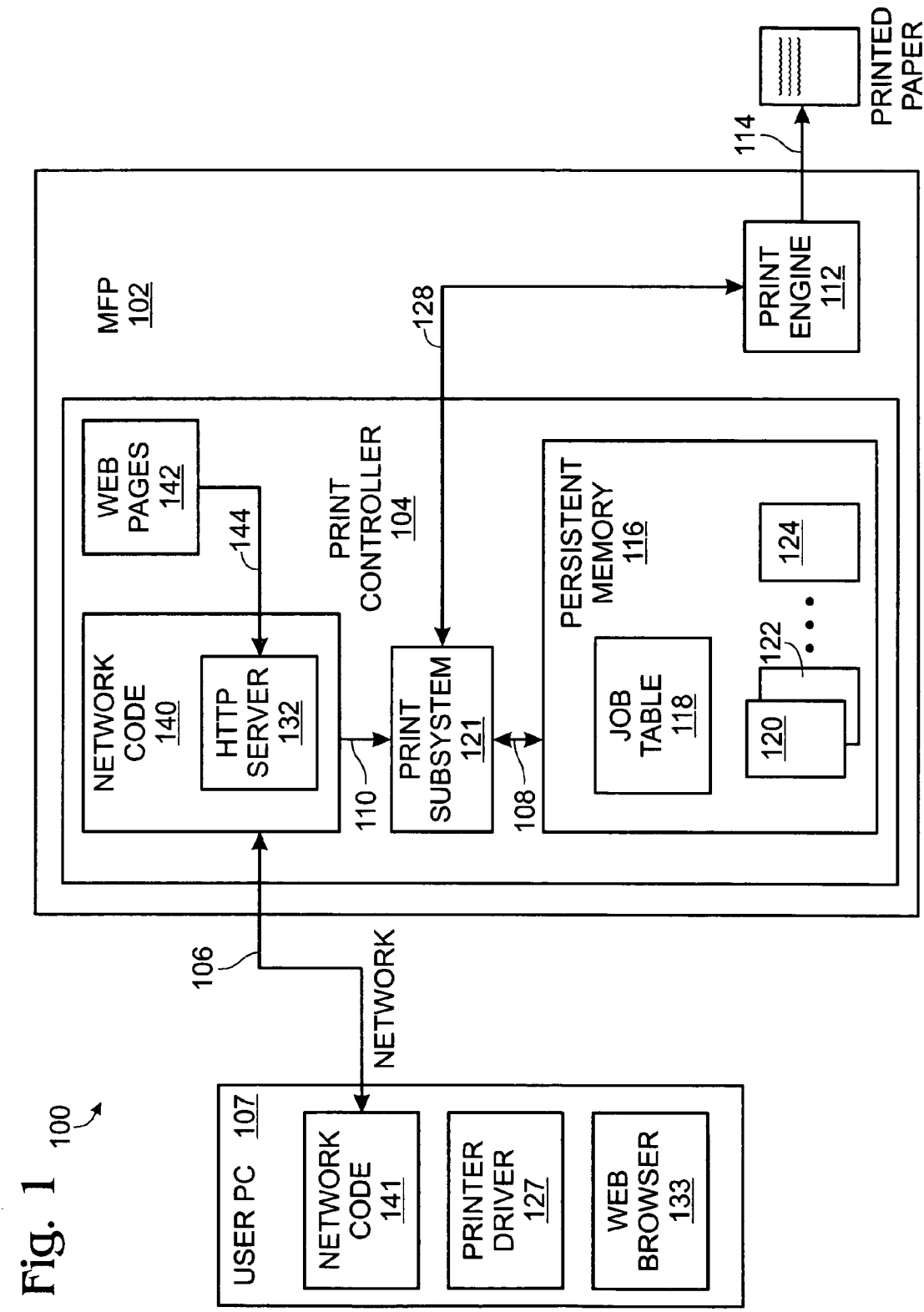
FIG. 1 is a schematic block diagram of the present invention system for the expedited reprinting of documents.

FIG. 1 is a schematic block diagram of the present invention system for the expedited reprinting of documents. The system 100 comprises a printer 102 with a print controller 104 having a network interface on line 106 to receive a selected job identification (JID). A printer 102 is defined herein as a device that accepts an electronically formatted job and provides a tangible medium output. Examples of printers may include scanners, fax machines, print-enabled copiers, and multifunctional peripherals (MFPs). Also shown is a client 107 having an interface on line 106 to supply the selected JID. The client may be a PC or a print server, for example.

The network interface represented by line 106 may be an Internet interface, local area network (LAN), or a local interface, such as a serial or parallel port connection. The invention is not limited to any particular network of communication protocols. Network code 140 may be used to interface network communications with the controller 104. The print controller 104 has an interface on line 108 for accessing a print engine-ready bitmap associated with the JID, and an interface on line 128 to supply the accessed bitmap. A print engine 112 has an interface on line 128 to accept the bitmap from the print controller 104 and an interface on line 114 to supply a tangible media document reprinted in response to the bitmap. The bitmap is a printer-ready raster image or display list that can be immediately, with little or no format conversion, be rendered by the print engine 112.

The system 100 may further comprise an accessible persistent memory 116 including a stored job table 118 and a stored bitmap. Shown are bitmaps 120, 122, and 124. However, the invention is not limited to any particular number of stored bitmaps. The print controller 104 accesses the job table (JT) 118, uses the job table 118 to locate a bitmap cross-referenced to the received JID, and reads the located bitmap from the memory.

Also shown is a print subsystem 126 having a network interface on line 110 to receive an initial print job identified with a JID. The print subsystem 126 may be comprised of elements (not shown) such as a print driver, spooler, print processor, or a port manager. In one aspect of the system, as shown, the print subsystem may be an element of the print controller. Typically, the print subsystem 126 receives the initial print job formatted in a page description language (PDL), such a printer control language (PCL) or PostScript (PS), and the JID formatted in printer job language (PJL) statements. For example, the initial print job and JI may be sent from a client print driver 127. The client 107 may send the initial print job from a print driver application such as Word, Excel, Power Point, or Word Perfect. However, the invention is not limited to any particular kind of application.

The print subsystem 126 renders the print job into a bitmap, and sends the bitmap on line 128 to the print engine 112 for the initial printing of the document. The print subsystem 126 saves the bitmap in memory 116. The print controller 104 accesses the job table 118 in memory 116 and creates a cross-reference between the JID and the saved bitmap.

In one aspect, the print controller 104 accesses the job table 118 from memory 116 and supplies the job table for posting described in HTML code. The system 100 may further comprise an HTTP server 132 having an interface on line 144 to accept HTML code and to supply an HTML webpage 142 on line 106 for the selection of JIDs from the job table. In this aspect, the print controller 104 accepts selected JIDs via an HTTP communication on line 106. In one aspect, the client has a web browser 133 with a network interface on line 106 for selecting JIDs from the webpage and sending the selected JIDs to the print controller 104 via an HTTP communication.

Alternately, the print controller 104 receives the initial print job identified with the JID, in an initial print driver communication from client print driver 127, and receives the selected JID in a subsequent print driver communication from print driver 127. For example, the subsequent print driver communication may include a simple PJL statement identifying a JID.

FIG. 2 is a drawing representing an exemplary job table. Shown are JIDs cross-referenced to bitmap location in memory. Besides receiving a JID with the initial print job, the print subsystem may also receive (or monitor) job attributes (JA) associated with the print job such as the document name, source print driver client IP address, sender name, source computer name, compression method, encryption method, encoded password, origination time/date, or other job attributes such as stapling, paper tray, sheet assembly, print time/date, or collation. For example, these JA may be supplied by the client print driver. The print controller 104 may save the received JA associated with the initial print job in the job table 118. When reprinting, the print controller 104 accesses the JA saved in the job table 118 and sends them, with the bitmap, to the print engine 112 for processing the reprinted document. For example, if printer tray 3 was selected for the initial printing, this job attribute may be saved, and the reprinted document may also be output to tray 3.

Returning to FIG. 1, alternately or in addition to receiving JA with the initial print job, the print controller 104 may monitor the print engine on line 128 and save job attributes associated with initially printing of the document, such as stapling, paper tray, sheet assembly, print time/date, or collation information. The monitored job attributes are then saved with the JID in the job table 118. The print controller 104 can access the JA saved in the job table 118 and send them, with the bitmap, to the print engine 112 for processing the reprinted document.

Functional Description

The present invention provides a means for reprinting as fast as possible. A typical configuration of a printer network includes a client's computer (PC), a network, and a printer. The network may include connections to a plurality of printers being shared by several clients. For the sake of simplicity, the invention of FIG. 1 has been described as a single PC and a single computer. The PC is connected to the network and is configured to execute a multiplicity of software applications such as, for example, Microsoft Word, Excel, and Power Point. All the applications share a common interface to the printer via the printer driver.

When a client first prints a Microsoft Word document for example, the print driver does its usual task of converting the Word document into PostScript. Also, the print driver permits the user to specify job attributes, such as staple in upper left corner. The print driver gathers JID and job attributes without user input. The driver is now ready to send all this data to the printer. For example, the print driver may send PJL statements with the JID, PJL statements with job attributes (JA), and a PostScript version of the document (the print job).

Figure 3:
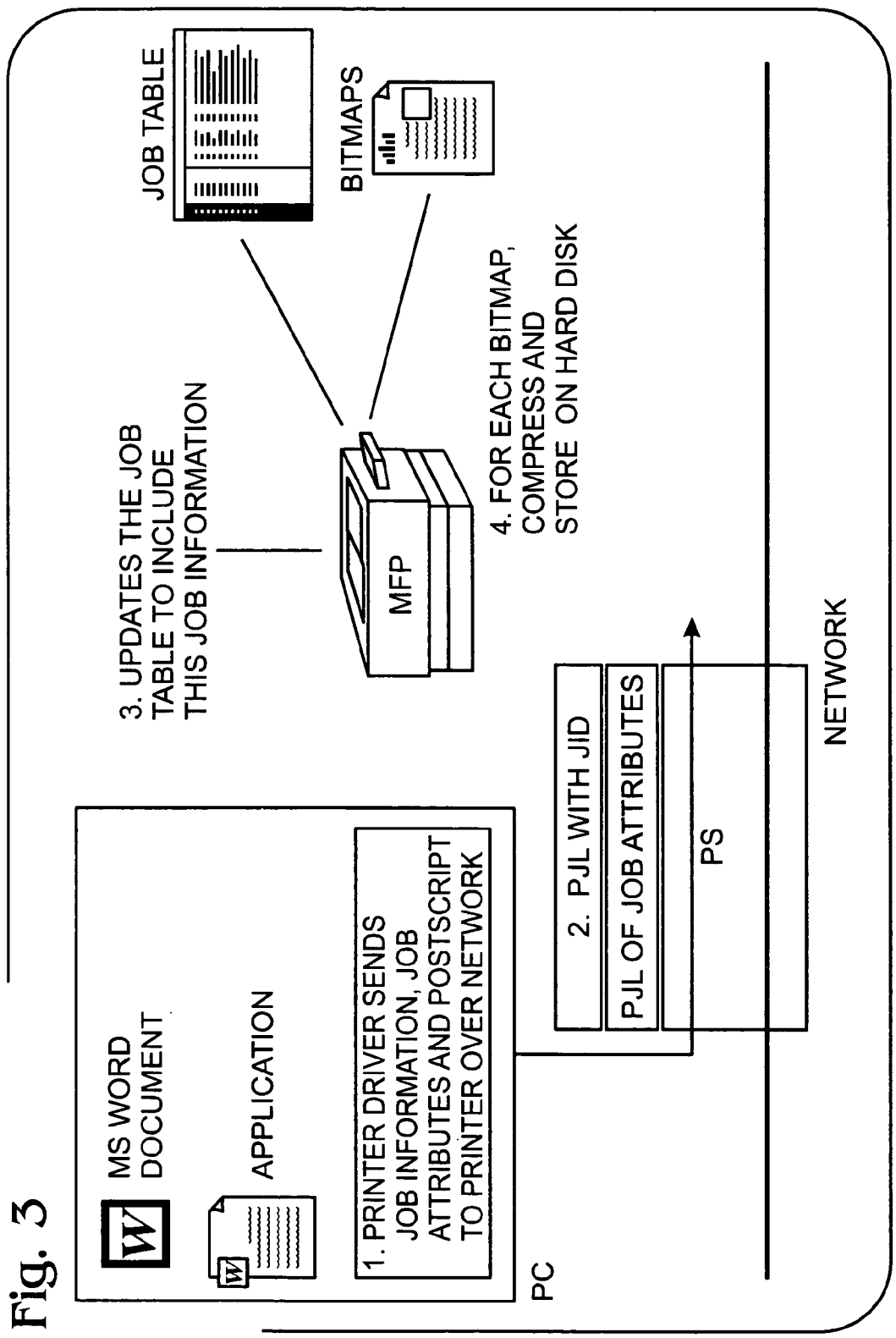
FIG. 3 is a drawing depicting the initial printing process.

FIG. 3 is a drawing depicting the initial printing process. The printer controller reads the JID and the job attributes. This data is stored in a data structure associated with the print job. The print controller (or print subsystem) reads and interprets the PDL and renders a bitmap for each printed page. It then sends the bitmap to the marking engine. The bitmap is compressed, perhaps encrypted, and stored on the printer's hard disk. When the entire job has been printed, and all bitmaps are stored on the hard disk, the job information is stored in the job table, along with the location of the bitmaps on the hard disk.

Additional data may also be stored in the job table. It may be useful to save the job attributes, such as staple in upper left corner, the selection of paper tray 3, the current date and time, and amount of toner used.

Figure 4:
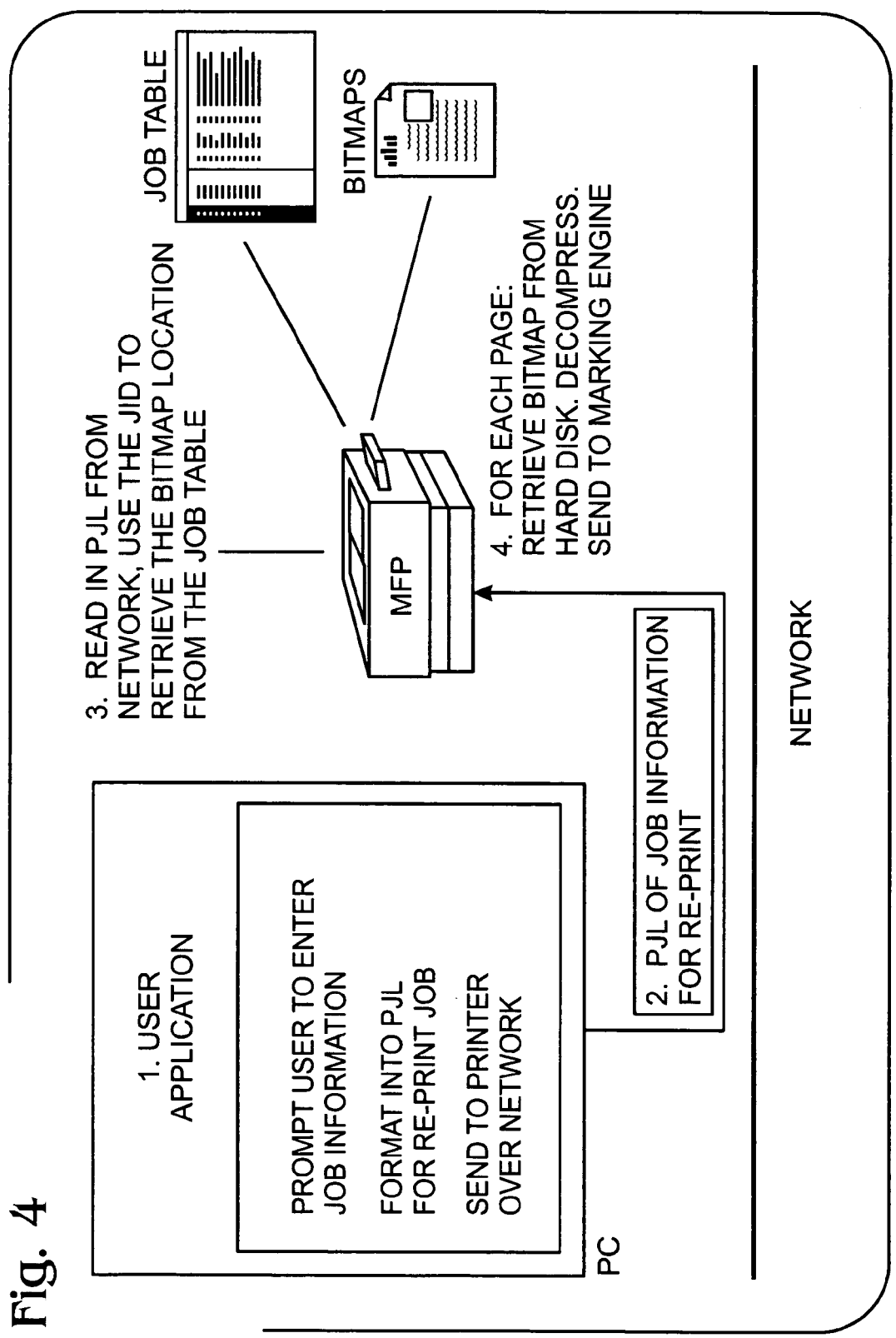
FIG. 4 is a drawing depicting the present invention reprinting process.

FIG. 4 is a drawing depicting the present invention reprinting process. Additional copies of the stored documents print at maximum engine speed. One method of initiating the additional prints is by using a web browser. The user brings up a webpage that is served by the printer. The page lists the stored documents. All this data is stored in the printer's job table. The user selects the document from this list. If the document is password protected, the browser prompts for the password to be entered. The user enters it. Other print options may be selected at this time, such as the number of copies, input paper tray, staple on/off, etc. Alternately, the printer driver running on a user's PC can send only the JID of the opened file.

With this information, the printer can find the stored document, decrypt it, uncompress it, and print it. After the print job is successfully rendered, the job table may be updated to reflect who requested the latest copy, when, number of copies, and time and date for example.

Over time, as the memory gets full, stored bitmaps may be erased to provide room for additional documents. These bitmaps can be removed automatically or upon user command. Automatically removal may use an algorithm such as:

FIFO;
Least accessed;
User priority (for example, the president's documents are never removed automatically);
Largest documents removed first;
Document type;
Timer; and,
Timer updated when job was last accessed.

The printer may store the bitmap in either a compressed or uncompressed format, offsetting speed for storage capability. Either hardware or software can be used to compress and/or decompress. Further, the stored bitmap may be encoded for security. Transport methods may include TCP/IP, Novell, AppleTalk, or any of the many network protocols available. The bitmaps can be stored on printer's ROM, zip drive, magnetic tape, FlashCard, CD, DVD, or removable hard disk.

The original document (initial print job) may be sourced from any application with a printer driver, for targeting to a printer, including but not limited to MS Word, MS Excel, MS Power Point, CorelDraw, Netscape, and MS Explorer. In addition, the print controller may be enabled to interpret JPG, PDF, TIFF, and raster files. In another variation, the print controller may store PDL or display list, as an alternative to a bitmap.

When the bitmap is accessed, the system can be enabled to store the date/time of any access, who accessed it, number of copies. Also, the job's timer may be reset. Color, grayscale and bi-tonal documents are supported. Although the JIDs have been described as being formatted in PJL statements, other job language may be used. Neither is the client PC limited to any particular operating system. The user's PC could run any operating system including MS Window, Linux, UNIX, Solaris, DOS, MS DOS.

Figure 5:
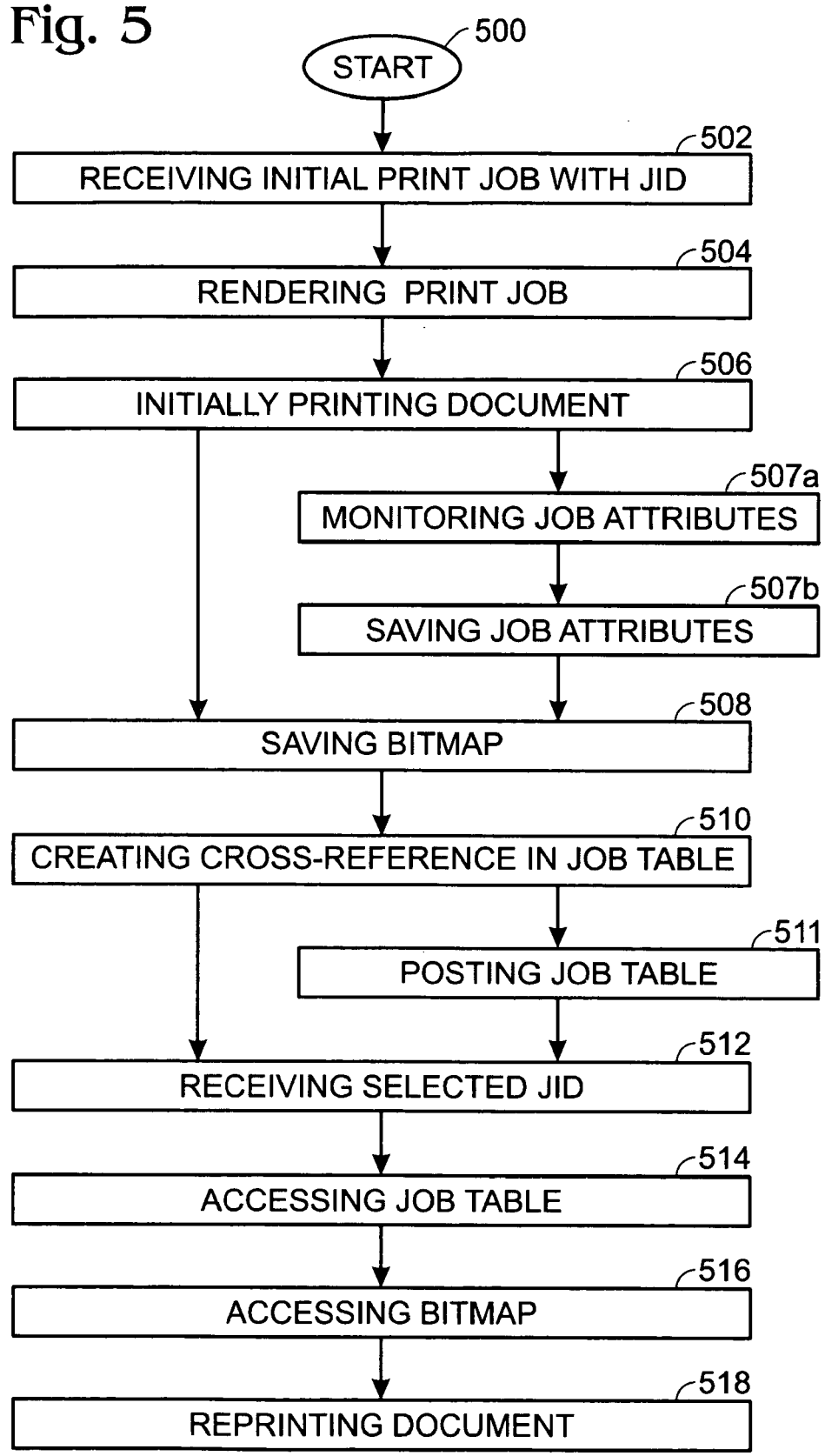
FIG. 5 is a flowchart illustrating the present invention method for the expedited reprinting of documents in a printer.

FIG. 5 is a flowchart illustrating the present invention method for the expedited reprinting of documents in a printer. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 receives an initial print job identified with a JID. For example, the print job may be formatted in PDL and the JID formatted in PJL statements. Step 504 renders the print job into a bitmap. Step 506, in response to rendering the bitmap, initially prints a document. Step 508 saves the bitmap in memory. Step 510 creates a cross-reference between the JID and the saved bitmap in a job table.

Step 512 receives a selected JID. Step 514, in response to receiving the JID, accesses the job table. Step 516 accesses a print engine-ready bitmap associated with the JID. In one aspect, Step 516 includes substeps (not shown). Step 516a uses the job table to locate a bitmap cross-referenced to the received JID. Step 516b reads the located bitmap from a printer memory. Step 518 reprints a document in response to the bitmap.

In one aspect of the method Step 511, using an associated network server, posts a job table including selectable JIs on an HTML webpage. Then, receiving the selected JID in Step 512 includes receiving the JID selection via an HTTP communication from a connected client. Alternately, receiving the initial print job identified with a JID in Step 502 includes receiving the print job and JID from a client print driver in an initial print driver communication. Then, Step 512 receives the selected JID from the client print driver in a subsequent print driver communication.

In one aspect, receiving the initial print job identified with a JID in Step 502 includes receiving job attributes (JA) associated with the print job such as document name, source print driver client IP address, sender name, source computer name, compression method, encryption method, encoded password, origination time/date, or other job attributes such as stapling, paper tray, sheet assembly, print time/date, or collation. Then, creating the cross-reference between the JID and the saved bitmap in Step 510 includes saving the JA attributes in the job table. Reprinting the document in response to the bitmap in Step 518 includes processing the reprinted document using the JA saved in the job table.

In a different aspect, Step 507a monitors job attributes associated with initially printing the document, such as stapling, paper tray, sheet assembly, print time/date, and collation information. Step 507b saves the monitored job attributes with the JID in the job table. Then, Step 518 processes the reprinted document using the job attributes saved in the job table.

Figure 6:
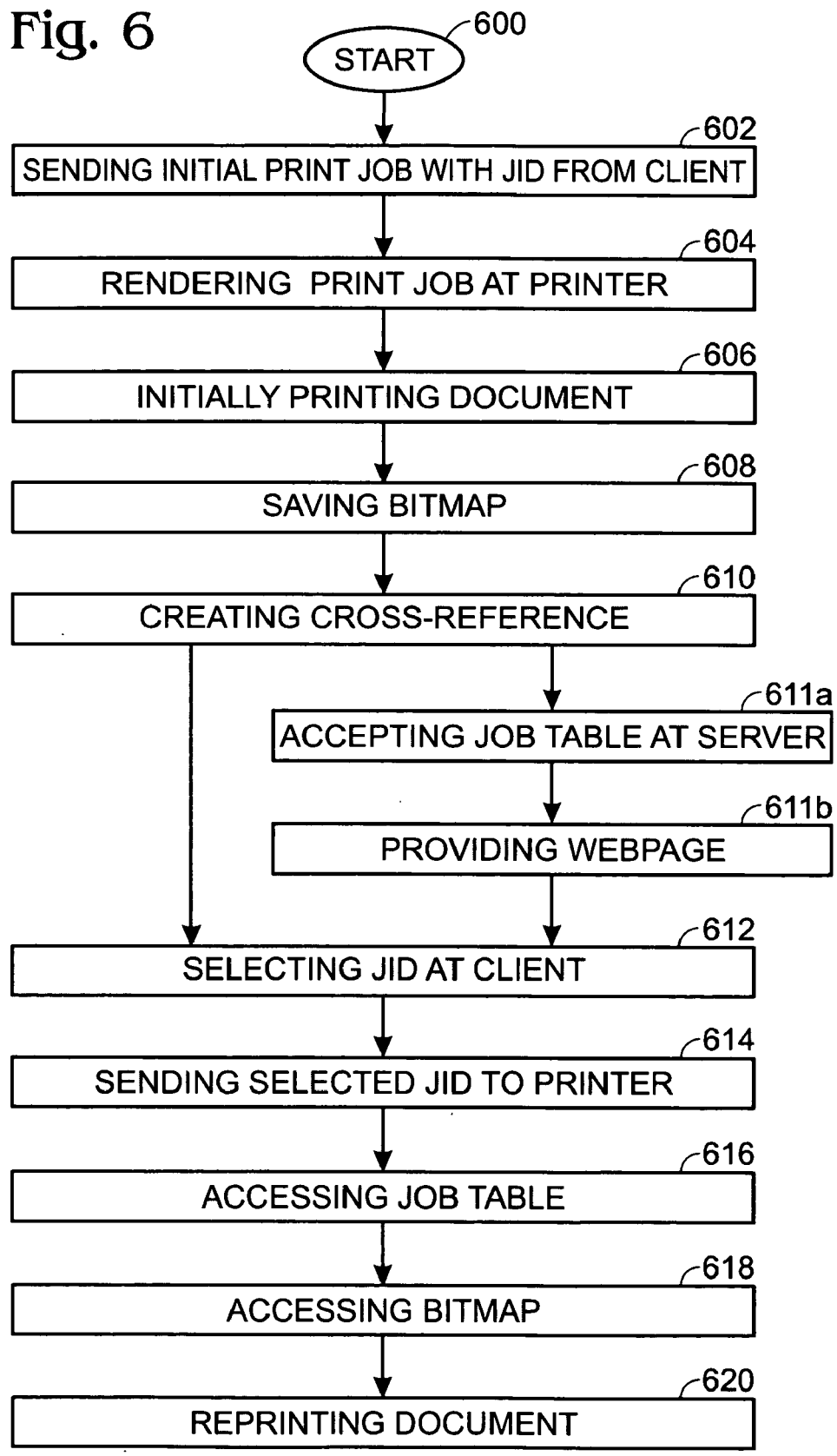
FIG. 6 is a flowchart illustrating a variation in the present invention method for the expedited reprinting of documents.

FIG. 6 is a flowchart illustrating a variation in the present invention method for the expedited reprinting of documents. The method starts at Step 600. Step 602 sends an initial print job identified with a JID, from a client print driver, to a printer. For example, the print job can be formatted in PDL and the JID formatted in PJL statements. The print job can be sent from a print driver application such as MS Word, Excel, Power Point, or Word Perfect for example. Step 604, at the printer, renders the print job into a bitmap. Step 606, in response to rendering the bitmap, initially prints a document. Step 608 saves the bitmap in memory. Step 610 creates a cross-reference between the JID and the saved bitmap in a job table.

Step 612 (at the client) selects a JID. Step 614 sends the selected JID to the client-connected printer. Step 616, in response to receiving the JID, accesses a job table. Step 618, at the printer, accesses a print engine-ready bitmap associated with the JID. For example, Step 618 may include substeps (not shown). Step 618a uses the job table to locate a bitmap cross-referenced to the received JID. Step 618b reads the located bitmap from a printer memory. Step 620 reprints a document in response to the bitmap.

In one aspect of the method Step 611a, at a network server, accepts a job table including selectable JIDs. Step 611b, from the server, provides an HTML webpage for receiving JID inquiries from a network-connected client browser. Then, receiving the selected JID in Step 612 includes receiving the JID selection via an HTTP communication from a client browser accessing the webpage. Alternately, Step 602 sends the print job and JID from the client print driver in an initial print driver communication, and Step 612 sends the selected JID from the client print driver in a subsequent print driver communication.

In one aspect, Step 602 additionally sends job attributes such as document name, source print driver client IP address, sender name, source computer name, compression method, encryption method, encoded password, origination time/date, or other attributes such as stapling, paper tray, sheet assembly, print time/date, or collation. Creating the cross-reference between the JID and the saved bitmap in Step 610 includes saving the job attributes in the job table. Then, Step 620 processes the reprinted document using the job attributes saved in the job table.

In a different aspect, Step 607a (at the printer) monitors job attributes associated with initially printing the document, such as stapling, paper tray, sheet assembly, print time/date, or collation information. Step 607b saves the monitored job attributes with the JID in the job table. Then, Step 620 processes the reprinted document using the job attributes saved in the job table.

A system and method for expedited job reprinting have been provided. Examples using particular print job and communications protocols have been used to clarify the invention. Also, particular examples of job attributes have been given. However, the invention is not limited to merely these examples. Other variations and embodiments of the invention will occur to those skilled in the art.

We claim:

1. In a printer, a method for the expedited reprinting of documents, the method comprising:
   receiving an initial print job formatted in a page description language (PDL) and identified with a job identification (JID) formatted in printer job language (PJL) statements;
   rendering the print job into the bitmap;
   receiving a selected JID;
   accessing a print engine-ready bitmap associated with the JID; and,
   reprinting a document in response to the bitmap.

2. The method of claim 1 further comprising:
   in response to receiving the JID, accessing a job table;
   wherein accessing the bitmap associated with the JID includes:
      using the job table to locate a bitmap cross-referenced to the received JID; and,
      reading the located bitmap from a printer memory.

3. The method of claim 1 further comprising:
   using an associated network server, posting a job table including selectable JIDs on an HTML webpage; and,
   wherein receiving the selected JID includes receiving the JID selection via an HTTP communication from a connected client.

4. The method of claim 1 further comprising:
   in response to rendering the bitmap, initially printing a document;
   saving the bitmap in memory; and,
   in a job table, creating a cross-reference between the JID and the saved bitmap.

5. The method of claim 4 wherein receiving the initial print job identified with a JID further includes receiving job attributes (JA) associated with the print job selected from the group including document name, source print driver client IP address, sender name, source computer name, compression method, encryption method, encoded password, origination time/date, stapling, paper tray, sheet assembly, print time/date, and collation.

6. The method of claim 5 wherein creating the cross-reference between the JID and the saved bitmap includes saving the JA in the job table; and,
   wherein reprinting the document in response to the bitmap includes processing the reprinted document using the JA saved in the job table.

7. The method of claim 4 further comprising:
   monitoring job attributes (JA) associated with initially printing the document, such as stapling, paper tray, sheet assembly, print time/date, and collation information;
   saving the monitored JA with the JID in the job table; and,
   wherein reprinting the document in response to the bitmap includes processing the reprinted document using the JA saved in the job table.

8. The method of claim 4 wherein receiving the initial print job identified with a JID includes receiving the print job and JID from a client print driver in an initial print driver communication; and,
   wherein receiving the selected JID includes receiving the selected JID from the client print driver in a subsequent print driver communication.

9. A method for the expedited reprinting of documents, the method comprising:
   sending an initial print job formatted in a page description language (PDL) and identified with a job identification (JID) formatted in printer job language (PJL) statements, from a client print driver, to a printer;
   at the printer, rendering the print job into the bitmap;
   at the client, selecting a job identification (JID);
   sending the selected JID to the client-connected printer;
   at the printer, accessing a print engine-ready bitmap associated with the JID; and,
   reprinting a document in response to the bitmap.

10. The method of claim 9 further comprising:
    in response to receiving the JID, accessing a job table;
    wherein accessing the bitmap associated with the JID includes:
       using the job table to locate a bitmap cross-referenced to the received JID; and,
       reading the located bitmap from a printer memory.

11. The method of claim 9 further comprising:
    at a network server, accepting a job table including selectable JIDs;
    from the server, providing an HTML webpage for receiving JID inquiries from a network-connected client browser; and,
    wherein receiving the selected JID includes receiving the JID selection via an HTTP communication from a client browser accessing the webpage.

12. The method of claim 9 further comprising:
    in response to rendering the bitmap, initially printing a document;
    saving the bitmap in memory; and,
    in a job table, creating a cross-reference between the JID and the saved bitmap.

13. The method of claim 12 wherein sending the initial print job identified with a JID includes sending job attributes (JA) associated with the print job selected from the group including document name, source print driver client IP address, sender name, source computer name, compression method, encryption method, encoded password, origination time/date, stapling, paper tray, sheet assembly, print time/date, and collation.

14. The method of claim 13 wherein creating the cross-reference between the JID and the saved bitmap includes saving the JA in the job table; and,
wherein reprinting the document in response to the bitmap includes processing the reprinted document using the JA saved in the job table.

15. The method of claim 12 further comprising:
at the printer, monitoring job attributes (JA) associated with initially printing the document, such as stapling, paper tray, sheet assembly, print time/date, and collation information;
saving the monitored JA with the JID in the job table; and,
wherein reprinting the document in response to the bitmap includes processing the reprinted document using the JA saved in the job table.

16. The method of claim 12 wherein sending the initial print job identified with a JID includes sending the print job and JID from the client print driver in an initial print driver communication; and,
wherein sending the selected JID includes sending the selected JID from the client print driver in a subsequent print driver communication.

17. The method of claim 12 wherein sending the initial print job identified with a JID, from a client print driver, includes sending the print job from a print driver application selected from the group including Word, Excel, Power Point, and Word Perfect.

18. In a printer, a system for the expedited reprinting of documents, the system comprising:
a print controller having a network interface to receive a selected job identification (JID) formatted in printer job language (PJL) statements, an interface for accessing a print engine-ready bitmap associated with the JID, and an interface to supply the accessed bitmap; and,
a print engine having an interface to accept the bitmap from the print controller and an interface to supply a tangible media document reprinted in response to the bitmap.

19. The system of claim 18 wherein the print controller accesses the job table from memory and supplies a job table for posting described in HTML code;
the system further comprising:
an HTTP server having an interface to accept the HTML code and to supply an HTML webpage for the selection of JIDs from the job table; and,
wherein the print controller accepts selected JIDs via an HTTP communication.

20. The system of claim 18 further comprising:
an accessible memory including a stored job table and a stored bitmap; and,
wherein the print controller accesses the job table, uses the job table to locate a bitmap cross-referenced to the received JID, and reads the located bitmap from the memory.

21. The system of claim 20 further comprising:
a print subsystem having a network interface to receive an initial print job identified with a JID, the print subsystem rendering the print job into a bitmap, sending the bitmap to the print engine for the initial printing of the document, and saving the bitmap in memory; and,
wherein the print controller accesses the job table in memory and creates a cross-reference between the JID and the saved bitmap.

22. The system of claim 21 wherein the print subsystem receives the initial print job formatted in a page description language (PDL).

23. The system of claim 21 wherein the print subsystem receives job attributes (JA) associated with the initial print job selected from the group including document name, source print driver client IP address, sender name, source computer name, compression method, encryption method, encoded password, origination time/date, stapling, paper tray, sheet assembly, print time/date, and collation.

24. The system of claim 23 wherein the print controller saves the received JA associated with the initial print job in the job table, accesses the JA saved in the job table, and sends them with the bitmap, to the print engine for processing the reprinted document.

25. The system of claim 21 wherein the print controller monitors the print engine and saves job attributes (JA) associated with initially printing of the document, such as stapling, paper tray, sheet assembly, print time/date, and collation information, with the JID in the job table; and,
wherein the print controller accesses the JA saved in the job table and sends them, with the bitmap, to the print engine for processing the reprinted document.

26. The system of claim 21 wherein the print controller receives the initial print job identified with the JID, in an initial print driver communication, and receives the selected JID in a subsequent print driver communication.

27. A system for the expedited reprinting of documents, the system comprising:
a client having an interface to supply a selected job identification (JID) formatted in printer job language (PJL) statements; and,
a printer including:
a print controller having a network interface connected to the client to receive the selected JID, the print controller having an interface to access a print engine-ready bitmap associated with the JID; and,
a print engine having an interface to accept the bitmap from the print controller and an interface to supply a document reprinted in response to the bitmap.

28. The system of claim 27 further comprising:
an accessible printer memory including a stored job table and stored bitmap;
wherein the print controller accesses the job table, uses the job table to locate a bitmap cross-referenced to the received JID, and reads the located bitmap from the memory.

29. The system of claim 27 wherein the print controller accesses the job table from memory and supplies a job table for posting described in HTML code;
the system further comprising:
an HTTP server having an interface to accept the HTML code and to supply an HTML webpage for the selection of JIDs from the job table; and,
wherein the client includes a web browser having a network interface for selecting JIDs from the webpage and sending the selected JIDs to the print controller via an HTTP communication.

30. The system of claim 27 wherein the client includes a print driver having a network interface to send an initial print job identified with a JID, to the printer;
the system further comprising:

a print subsystem having a network interface to receive the initial print job identified with the JID, the print subsystem rendering the print job into a bitmap, sending the bitmap to the print engine for the initial printing of the document, and saving the bitmap in memory; and, wherein the print controller creates a cross-reference between the JID and the saved bitmap, in a job table stored in memory.

31. The system of claim 30 wherein the client print driver sends the initial print job formatted in a page description language (PDL).

32. The system of claim 30 wherein the client print driver sends job attributes (JA) associated with the print job selected from the group including document name, source print driver client IP address, sender name, source computer name, compression method, encryption method, encoded password, origination time/date, stapling, paper tray, sheet assembly, print time/date, and collation.

33. The system of claim 32 wherein the print controller saves the received JA associated with the initial print job in the job table, accesses the JA saved in the job table, and sends them with the bitmap, to the print engine for processing the reprinted document.

34. The system of claim 30 wherein the print controller monitors the print engine and saves job attributes (JA) associated with initially printing the document, such as stapling, paper tray, sheet assembly, print time/date, and collation information, with the JID in the job table; and, wherein the print controller accesses the JA saved in the job table and sends them, with the bitmap, to the print engine for processing the reprinted document.

35. The system of claim 30 wherein the client print driver sends the initial print job and JID to the print controller in an initial print driver communication, and sends the selected JID in a subsequent print driver communication.

36. The system of claim 30 wherein the client sends the initial print job from a print driver application selected from the group including Word, Excel, Power Point, and Word Perfect.

* * * * *